Patented Jan. 5, 1937

2,067,149

UNITED STATES PATENT OFFICE 2,067,149

AZODYESTUFFS INSOLUBLE IN WATER

Werner Zerweck, Frankfort-on-the-Main-Fechenheim, Norbert Steiger, Frankfort-on-the-Main, August Modersohn, Cologne-Mulheim-on-the-Rhein, and Werner Schleifenbaum, Leverkusen, Germany, assignors to General Aniline Works, Inc., New York, N. Y., a corporation of Delaware No Drawing. Application April 2, 1936, Serial No. 72,288. In Germany April 12, 1935

5 Claims. (Cl. 260—95)

Our present invention relates to new valuable azodyestuffs insoluble in water more particularly to those corresponding to the general formula:

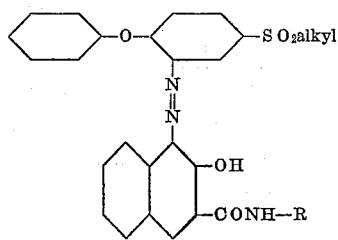

wherein R stands for a radical of the benzene or naphthalene series.

The new dyestffs are suitable for the manufacture of valuable color lakes and yield when produced on the fiber valuable dyeings and printings which are distinguished by an intense yellowish shade and by good fastness properties.

The effect of the new dyestuffs is surprising as the isomeric dyestuffs containing the phenoxy group in the o-position relative to the alkylsulfone group instead of to the diazo group show inferior tinctorial properties.

In order to further illustrate our invention the following example is given, the parts being by weight and all temperatures in centigrade degrees. We wish it however to be understood that our invention is not limited to the particular products nor reaction conditions mentioned therein.

Example

Boiled cotton yarn is impregnated in the usual manner in the following impregnating bath (a) and then developed in the following dyeing bath (b):

(a) *impregnating bath*

| | | |
|---|---|---|
| 1 - (2 ' - hydroxy - 3 ' - naphthoylamino) - 2 - methyl-4-chlorobenzene | grs | 4 |
| Turkey red oil of 50% strength | cc | 8 |
| Caustic soda solution of 34° Bé | cc | 12 |
| Solution of formaldehyde of 30% strength | cc | 2 |
| Boiling water | cc | 500 |
| Made up with water to | liter | 1 |

(b) *dyeing bath*

3 grs. of 2-amino-4-propylsulfone-diphenyl-ether of the formula:

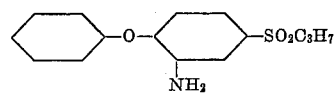

are dissolved at room temperature in a mixture of 3.2 grs. of nitrosyl sulfuric acid and 5 grs. of concentrated sulfuric acid and the mixture is heated to 30° C. for about 1 hour. When the diazo solution is diluted with ice-water to about 2 liters, 50 grs. of sodium chloride are added and the sulfuric acid is neutralized by means of sodium acetate.

Then the dye goods are rinsed, soaped in the hot, rinsed again and dried. In this manner a clear strong yellowish scarlet dyeing of very good fastness properties is obtained.

The 2 - amino-4-propylsulfone-diphenyl-ether may be prepared as for example in the following manner:

4-chloro-1-propylsulfone-benzene is dissolved in concentrated sulfuric acid and nitrated with nitric acid. 25 parts of the 3-nitro-4-chloro-1-propylsulfone-benzene thus obtained are treated in the usual manner with 20 parts of potassium phenolate whereby the 2-nitro-4-propylsulfone-diphenyl-ether is obtained which is reduced to the 2-amino-4-propylsulfone-diphenyl-ether of the M. P. 125° C.

The following table shows the shades of some further new dyestuffs:

| Diazo-compound of the base | Combined with the 2'-hydroxy-3'-naphthoyl-compound of— | Shade |
|---|---|---|
| ⬡—O—⬡(NH₂)(SO₂C₂H₅) | 4-chloro-1-aminobenzene<br>4-chloro-2-methyl-1-aminobenzene | Yellowish scarlet.<br>Bright yellowish scarlet. |
| Cl—⬡—O—⬡(NH₂)(SO₂C₂H₅) | 2-naphthylamine<br>4-chloro-1-aminobenzene | Yellowish scarlet.<br>Clear yellowish scarlet. |
| ⬡(Cl)—O—⬡(NH₂)(SO₂C₂H₅) | 2-naphthylamine<br>4-chloro-1-aminobenzene | Yellowish scarlet.<br>Do. |
| H₃C—⬡—O—⬡(NH₂)(SO₂C₂H₅) | 2-methoxy-1-aminobenzene<br>2.5-dimethoxy-4-chloro-1-aminobenzene | Scarlet.<br>Clear yellowish red. |
| ⬡—O—⬡(NH₂)(SO₂C₃H₇) | Aminobenzene<br>4-chloro-1-aminobenzene<br>2-naphthylamine<br>2-methoxy-1-aminobenzene | Yellowish scarlet.<br>Do.<br>Bright yellowish scarlet.<br>Yellowish scarlet. |
| Cl—⬡—O—⬡(NH₂)(SO₂C₃H₇) | Aminobenzene<br>4-chloro-1-aminobenzene<br>4-chloro-2-methyl-1-aminobenzene<br>2-methoxy-1-aminobenzene<br>4-methoxy-1-aminobenzene | Orange.<br>Yellowish scarlet.<br>Do.<br>Do.<br>Do. |
| Cl—⬡(Cl)—O—⬡(NH₂)(SO₂C₃H₇) | Aminobenzene<br>4-chloro-1-aminobenzene<br>2-naphthylamine | Do.<br>Do.<br>Do. |
| ⬡—O—⬡(NH₂)(SO₂C₄H₉) | 2.5-dimethoxy-4-chloro-1-aminobenzene | Red. |
| Cl—⬡—O—⬡(NH₂)(SO₂C₄H₉) | 5-chloro-2-methoxy-1-aminobenzene<br>4-methoxy-3-chloro-1-aminobenzene | Yellowish scarlet.<br>Red orange. |
| H₃C—⬡—O—⬡(NH₂)(SO₂C₄H₉) | 2-methoxy-1-aminobenzene<br>2.5-dimethoxy-4-chloro-1-aminobenzene | Yellowish scarlet.<br>Scarlet. |

We claim:
1. Azodyestuffs insoluble in water of the general formula:

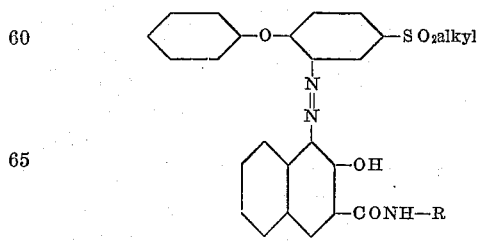

wherein R stands for a radical of the group consisting of the radicals of the benzene and naphthalene series which dyestuffs are suitable for the manufacture of valuable color lakes and yield when produced on the fiber valuable dyeings and printings which are distinguished by an intense yellowish shade and by good fastness properties.

2. Azodyestuffs insoluble in water of the general formula:

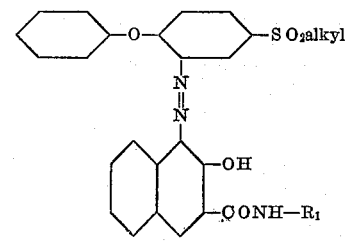

wherein R₁ stands for a radical of the benzene series containing at least one alkoxy group which dyestuffs are suitable for the manufacture of valuable color lakes and yield when produced on the fiber valuable dyeings and printings which are distinguished by an intense yellowish shade and by good fastness properties.

3. An azodyestuff insoluble in water of the formula:

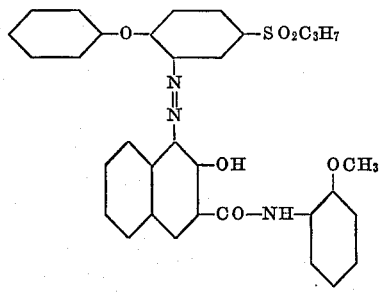

which dyestuff dyes when prepared on the fiber yellowish scarlet shades.

4. An azodyestuff insoluble in water of the formula:

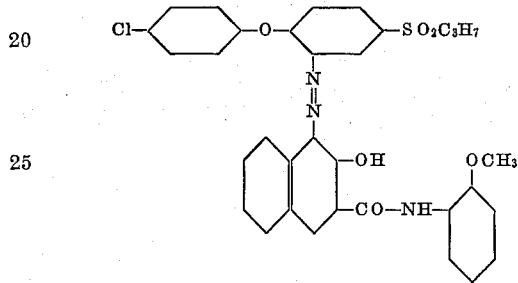

which dyestuff dyes when prepared on the fiber yellowish scarlet shades.

5. An azodyestuff insoluble in water of the formula:

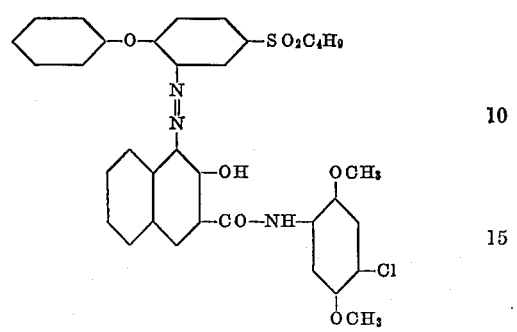

which dyestuff dyes when prepared on the fiber red shades.

WERNER ZERWECK.
NORBERT STEIGER.
AUGUST MODERSOHN.
WERNER SCHLEIFENBAUM.